INVENTOR
FRANK MARTIN
RICHARD BOTTING
BY
Watson, Cole, Grindle & Watson
ATTORNEY INVENTOR
FRANK MARTIN
RICHARD BOTTING
BY
Watson, Cole, Grindle & Watson
ATTORNEY INVENTOR
FRANK MARTIN
RICHARD BOTTING
BY
Watson, Cole, Grindle & Watson
ATTORNEY United States Patent Office 2,933,654

Patented Apr. 19, 1960

2,933,654

CHASSIS ASSEMBLY AND WIRING SYSTEMS FOR ELECTRICAL APPARATUS

Richard Ernest Botting and Frank Martin, Hayes, England, assignors, by mesne assignments, to Fairey Aviation Limited, Hayes, England, a company of Great Britain Application September 22, 1958, Serial No. 762,418

Claims priority, application Great Britain September 23, 1957

8 Claims. (Cl. 317—99)

This invention relates to an improved assembly and wiring system for electrical apparatus of the type comprising a number of components or assembly units (herein referred to collectively as components) which are required to be detachably mounted on a common chassis and connected electrically to another or to associated electrical circuits, for example to a supply, by wiring. The invention is particularly although not exclusively, applicable to electrically-controlled guided missiles, and may also be applied to the assembly and wiring of other electronic equipment, e.g. radio, of the chassis-mounted type referred to.

The present invention comprises an assembly system incorporating encapsulated chassis wiring interconnecting the components. Thus according to the present invention each of the various components is electrically connected to one part of a multi-pin plug-and-socket electrical connector the cooperating part of which is mounted on the chassis and connected to the chassis wiring, and the chassis wiring itself, preferably including the connections to the chassis-mounted connector part, is housed in hollow or recessed elongated chassis members filled with moulded insulating material in which the wiring is embedded.

In one form of the invention cooperating guides are provided on the chassis and on each component for correctly locating the component for assembly in relation to the chassis during its movement into its required assembled position, and the part of the connector associated with each component is mounted thereon in a position in which it will be automatically coupled to the cooperating chassis-mounted part of the connector when the component is moved into its assembled position. The guiding means may comprise a key and a cooperating key-way one afforded on the chassis and the other on the component.

Thus the apparatus can be quickly and accurately assembled on site by assembling the components in position on the chassis with the aid of the guiding means, the plug-and-socket connectors thereby effecting the necessary electrical connections, and all loose wiring with its attendant draw-backs will be completely avoided. The chassis wiring is fully insulated within the encapsulating insulation in the chassis members and is additionally mechanically protected by the walls or flanges of the elongated chassis members in which it is embedded.

Screw means may be provided for engagement between the chassis and each component and serving when rotated to draw the component home into its assembled position on the chassis under the control of the cooperating guides, and to hold the component in its assembled position when fully tightened.

Figure 1:
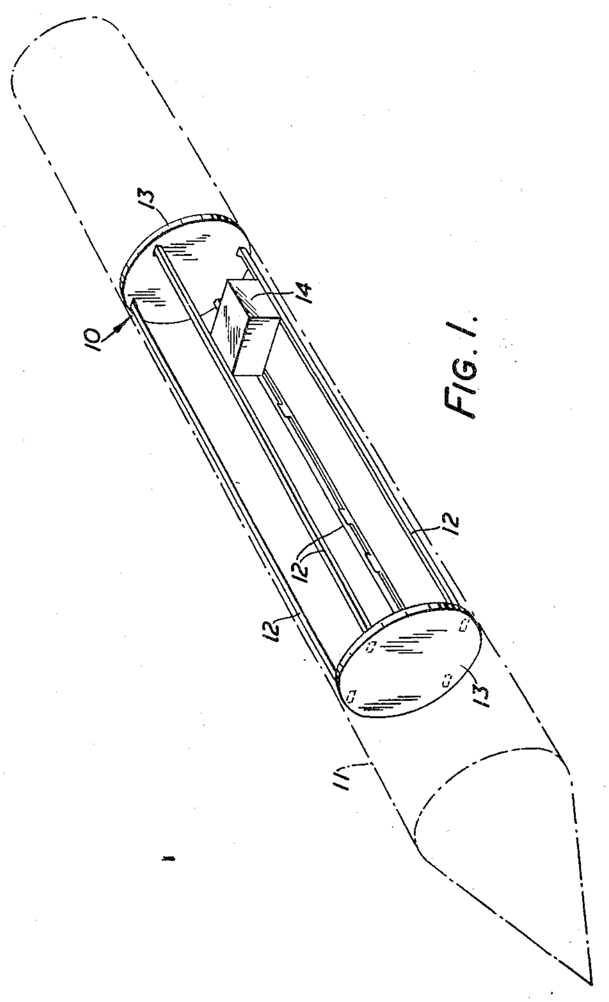
Figure 2:
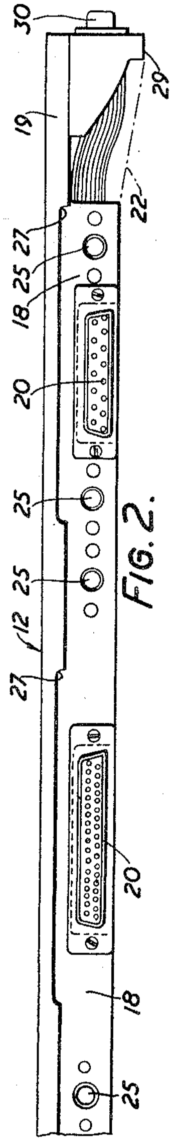
Figure 3:
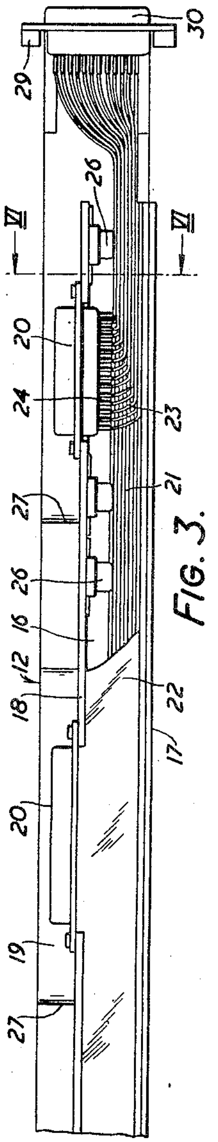
Figure 6:
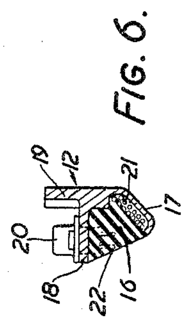
Figure 4:
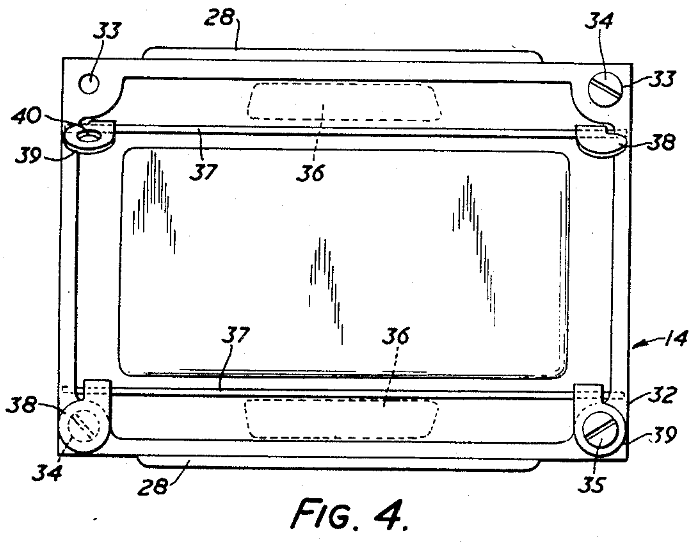
Figure 5:
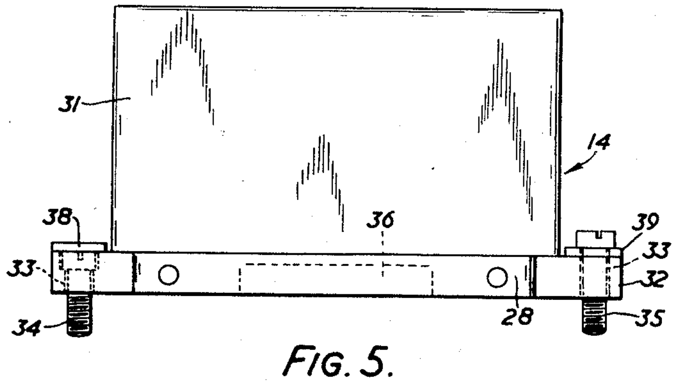

The invention may be carried into practice in various ways, but one specific embodiment will now be described by way of example with reference to the accompanying drawings, in which Figure 1 is a general perspective view of the chassis of a guided missile showing one of the detachable electronic components in position, Figures 2 and 3 are respectively plan and elevation on a larger scale of part of one of the longitudinal chassis members, Figures 4 and 5 are respectively plan and elevation of one of the components for mounting on the chassis, the body of the component being represented diagrammatically, and Figure 6 is a cross-section of the chassis member of Figures 2 and 3.

In the illustrated embodiment the invention is applied to the chassis-mounted electronic control mechanism of a guided missile, in which the assembled chassis 10 is slid into one open end of an elongated tubular outer casing 11 of the missile shown in broken lines in Figure 1.

The chassis 10 comprises a skeleton structure of four parallel spaced longitudinal members 12 secured together at their ends by end frames 13 and if necessary interconnected by bracing frames (not shown). The various electronic components and/or sub-assemblies are detachably mounted on the chassis longitudinal members 12 within the interior of the chassis, one only of the components and/or sub-assemblies being shown at 14 in Figure 1, and are electrically connected in their associated electric circuits by an encapsulated wiring system to be described.

The lower pair of longitudinal members 12 are generally T-sectioned extruded or fabricated aluminium members each affording a longitudinal channel or recess 16 between inclined flanges 17 and 18 protruding from a base 19 (Figure 6). Spaced at intervals along the length of each member 12 are a number of multi-orifice electrical connector sockets 20 each mounted in a recess cut in the flange 18 so that it faces away from the inclined flange 17. The terminals of the connector sockets 20 are appropriately connected to electrical chassis wiring 21 which extends along the recess 16 of the longitudinal members 12, and in order to avoid any loose wiring in the chassis 10 such as might hinder it sliding into the outer casing 11 or might be liable to breakage, the recesses 16 are filled with moulded plastic insulating material 22 in which the whole of the chassis wiring 21, including the transversely projecting ends 23 and their soldered connections 24 to the socket terminals, is embedded. A suitable insulating material for this purpose is Thiokol rubber, which does not harden in cold or hot climates. For illustration purposes the insulation 22 is shown broken away at the right hand end of Figure 3 to reveal the wiring, but it will be understood that in practice the insulation 22 extends to the ends of each member 12 in the recess 16.

Each of the lower members 12 is also formed with pairs of holes 25 backed by trapped nuts 26, each pair being spaced apart on either side of one of sockets 20 to receive a pair of mounting bolts of an associated component 14. In addition a key way 27 is formed in the face of the base flange 19 of the member adjacent to each socket 20 for the purpose of receiving a cooperating key 28 (Figure 4) formed on the component 14. At its two ends each member 12 is formed with end brackets 29 each of which carries a further multi-orifice socket member 30 whose terminals are connected to the chassis wiring 21, enabling the chassis to be connected to adjacent sections carrying corresponding multi-pin plugs, or to wander plugs, for connecting up the chassis wiring to adjacent circuits, for example to an electric supply.

A representative component 14 is illustrated in more detail in Figures 4 and 5, the body of the component which is illustrated diagrammatically only at 31 being mounted on a forged supporting frame 32 formed at its four corners with four holes 33 to receive the mounting bolts 34 and 35. Two diagonally opposed mounting bolts 34 are trapped in the associated holes 33 with their heads recessed but are free to be rotated in the holes, whilst the other two, longer bolts 35 are freely withdrawable from their associated diagonally opposed holes 33. The spacing between the holes 33 in each longitudinal edge of the frame 32 is equal to the spacing of the holes 25 at the station on the lower chassis member 12 where it is required to mount the particular component 14, whilst the transverse distance between the holes 33 in one longitudinal edge and those in the other edge of the component is equal to the distance between the two lower chassis members 12 as measured between the centres of their holes 25. Thus the component 14 can be mounted at the selected station on the two lower members 12 with its frame 32 bridging the gap between the two members. The frame 32 of the component is provided on its longitudinal edges with a pair of key plates 28 shaped and dimensioned to cooperate with the key ways 27 for locating and guiding the component. In addition the frame 32 carries a pair of multi-pin plug connectors 36 constructed and positioned to enter and cooperate with the two sockets 20 of the members 12 at the selected station when the component is drawn into its assembled position on the members 12 by means of the mounting bolts 34 and 35, the keys 28 sliding in their cooperating key ways 27. The terminals of the two plug connectors 36 are appropriately connected to the electric circuits of the component 14, so that the inter-engagement of the plugs 36 and sockets 20 serves to connect the component electrically to the chassis wiring 21 in the correct manner to effect its connection to the other components and to the adjacent electric supply and other circuits.

For the purpose of securing each component 14 against unintentional withdrawal, the component frame 32 is provided adjacent each longitudinal edge with a hinged flap member comprising a spindle 37 journalled at its ends in the frame and carrying a pair of flaps 38 and 39, which can be moved by the rotation of the spindle from a position clear of the holes 33 into a position in which each flap overlies one of the two holes 33 in the associated edge. The flap 38 which overlies the hole 33 housing the trapped mounting bolt 34 is imperforate whilst the other flap 39 is formed with a hole 40 which comes into register with associated hole 33 and is capable of receiving the stem of the mounting bolt 35.

Thus when it is required to assemble one of the components 14 in its proper station on the members 12, the component is positioned by the engagement of the keys 28 and key ways 27, and the two diagonally opposite trapped mounting bolts 34 are engaged in the corresponding holes 25 and nuts 26 of the members 12 and are slowly and evenly rotated to draw the component frame smoothly and steadily home into its assembled position, thereby causing the plugs 36 to engage and be inserted into the cooperating sockets 20 to effect the electrical connection of the component to the chassis wiring. When the bolts 34 have been fully tightened down, the two flap spindles 37 are rotated to cause the flaps 38 to overlie the recessed heads of the bolts 34. Then the other two mounting bolts 35 are inserted through the holes 40 in the other two flaps 39 and through the registering holes 33 into the associated holes 25 in the members 12 and are tightened down onto the flaps 39 so that the removal of the other two bolts 34 is prevented by the flaps 38 overlying their recessed heads.

To withdraw the component the procedure is reversed, the bolts 35 being first removed and the flaps swung up to expose the recessed bolts 34, which are then slowly and evenly unscrewed to lift the component frame off its seat on the chassis member and to disengage the plugs and sockets of the electrical connectors.

The arrangement described provides a particularly convenient, neat and robust system for assembling the components of an electronic apparatus on a chassis in their predetermined spatial and electrical inter-relationship, the plug-and-socket connectors effecting the correct electrical interconnection without the necessity for making or remaking any screwed or soldered electrical connections. There is no loose wiring, all the wiring being fully protected and insulated by its embedding material and being shielded against mechanical hazards by the metal flanges of the chassis members in which it is housed.

What we claim as our invention and desire to secure by Letters Patent is:

1. An assembly of electrical components which comprises a chassis frame made up from elongated channel-sectioned chassis members, on which members a plurality of the components are detachably mounted by means of plug-and-socket connectors, each connector comprising a connector part electrically and mechanically secured to one of the components and a cooperating connector part secured mechanically to one of the channel-sectioned chassis members and having terminals extending through an aperture in the chassis member into its interior channel, electrical wiring housed wholly within the channels of the chassis members and electrically connected to the terminals of the connector parts carried thereby, and solid moulded insulating material filling the channels of the chassis members, the whole of the chassis wiring and its connections to the terminals of the connector part being embedded within the insulating material.

2. An assembly as claimed in claim 1 which includes cooperating guides on the chassis and on each component for correctly locating the component for assembly in relation to the chassis during movement of the component into its required assembled position, and in which the part of the connector associated with each component is mounted thereon in a position in which it will be automatically coupled to the cooperating chassis-mounted part of the connector when the component is moved into its assembled position.

3. An assembly as claimed in claim 2 in which the guiding means comprises a key and a cooperating key-way, one afforded on the chassis and the other on the component.

4. An assembly as claimed in claim 2 which includes screw means engageable between the chassis and each component and rotatable to draw the component towards the associated chassis member into its assembled position on the chassis under control of the guides, the screw means when fully tightened holding the component in position on the chassis.

5. An assembly as claimed in claim 2 in which each component is secured at opposite edges to two spaced chassis members.

6. An assembly as claimed in claim 5 in which each component is provided with duplicate connector parts at its said opposite edges which engage in cooperating connector parts respectively mounted on the two chassis members.

7. An assembly as claimed in claim 6 including separate screw means associated with the said two edges of the component, each screw means comprising a pair of bolts passing through spaced holes in the component and engaging screw-threaded sockets in the associated chassis member to bolt the component to the chassis.

8. An assembly as claimed in claim 7 in which each of the said edges of the component carries a hinged flap movable into a position in which it overlies both holes in that edge, and can be secured in that position overlying the head of one of the bolts in its hole by the other bolt passing through a registering hole in the flap when the component edge is bolted to the chassis member.

References Cited in the file of this patent

UNITED STATES PATENTS

| | | |
|---|---|---|
| 2,598,534 | Gordon | May 27, 1952 |
| 2,688,703 | Giovanni | Sept. 7, 1954 |
| 2,796,559 | Feucht | June 18, 1957 |